US010848921B1

(12) United States Patent
McInnis et al.

(10) Patent No.: US 10,848,921 B1
(45) Date of Patent: Nov. 24, 2020

(54) SYSTEM AND METHOD OF TRACKING ENTRY TO AND EXIT FROM A CONFINED SPACE

(71) Applicant: THE BOEING COMPANY, Chicago, IL (US)

(72) Inventors: Michael D. McInnis, Port Orchard, WA (US); Ali Salour, St. Louis, MO (US); David S. Pang, Bellevue, WA (US); Daren Salstrom, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/670,195

(22) Filed: Oct. 31, 2019

(51) Int. Cl.
*H04W 4/029* (2018.01)
*H04W 4/021* (2018.01)
*H04B 17/309* (2015.01)

(52) U.S. Cl.
CPC .......... *H04W 4/029* (2018.02); *H04B 17/309* (2015.01); *H04W 4/021* (2013.01)

(58) Field of Classification Search
CPC ..... H04W 4/029; H04W 4/021; H04B 17/309
USPC .......................................... 455/414.3, 456.1
See application file for complete search history.

(56) References Cited

U.S. PATENT DOCUMENTS

| 4,331,953 | A | 5/1982 | Blevins et al. |
| 4,906,972 | A | 3/1990 | Spencer |
| 8,880,340 | B2 | 11/2014 | Erignac et al. |
| 9,606,001 | B2 | 3/2017 | Vance et al. |
| 2014/0146732 | A1* | 5/2014 | Olufunmilola ....... H04L 5/0073 370/311 |
| 2015/0351103 | A1* | 12/2015 | Kim ....................... H04W 16/28 455/452.1 |
| 2016/0029224 | A1* | 1/2016 | Edge ..................... H04W 24/08 455/456.1 |
| 2017/0351923 | A1* | 12/2017 | Rice, II .................... G07C 9/30 |
| 2018/0293523 | A1* | 10/2018 | Bergdale .................. G07C 9/10 |
| 2018/0309681 | A1* | 10/2018 | Dahod .................... H04L 47/20 |
| 2020/0066129 | A1* | 2/2020 | Galvez ............... G08B 21/0294 |

(Continued)

OTHER PUBLICATIONS

Zhang et al., "Wireless localization based on RSSI fingerprint feature vector", International Journal of Distributed Sensor Networks, vol. 2015, May 2015, pp. 1-7.

*Primary Examiner* — Inder P Mehra
(74) *Attorney, Agent, or Firm* — Womble Bond Dickinson LLP

(57) ABSTRACT

A method of tracking entry to and exit from a confined space includes a portable radio beacon placed proximate to but outside the confined space transmitting a first radio signal with an identifier that is associated with the confined space. A mobile device receives the first radio signal, measures a first real-time value of a first measure of received signal strength or quality, and transmits a second radio signal with the identifier and the first real-time value. A base station receives the second radio signal, measures a second real-time value of a second measure of received signal strength or quality, and transmits data including the identifier, and the first and second real-time values. A computer receives the data, determines proximity of the mobile device to the confined space from the identifier, and determines whether the mobile device is outside or inside the confined space from the real-time values.

24 Claims, 8 Drawing Sheets

(56) References Cited

U.S. PATENT DOCUMENTS

2020/0082551 A1* 3/2020 Steiner ................. G01S 5/0294
2020/0120150 A1* 4/2020 Bongaarts ............. H04L 65/605

* cited by examiner

SYSTEM AND METHOD OF TRACKING ENTRY TO AND EXIT FROM A CONFINED SPACE

TECHNOLOGICAL FIELD

The present disclosure relates generally to monitoring access to a confined space and, in particular, to monitoring entry to and exit from a confined space using measures of received signal strength or quality to and from a mobile device.

BACKGROUND

There exist several situations in which a worker must enter a confined space in order to perform some work. One example of such a work situation is in the aircraft industry, where workers must climb inside the fuel tanks located in the wings of an aircraft in order to clean and seal the inside of the fuel tanks before they are filled with fuel. Generally, the solvents which are used in cleaning these fuel tanks give off fumes which are toxic in varying degrees.

Access by manufacturing or maintenance personnel to confined spaces—and in particular hazardous confined spaces—is often accompanied by particularly exacting safety precautions. Some solutions utilize a trained attendant to maintain communication with a worker in a confined space. These solutions require that an extra person be placed on the job and often result in a sharp increase in costs and inefficient use of personnel. Other solutions utilize electronic communications equipment to monitor a worker's status in a confined space. Many of these other solutions, however, place responsibility on the worker to operate the equipment when entering or exiting the confined space.

Therefore it would be desirable to have a system and method that takes into account at least some of the issues discussed above, as well as other possible issues.

BRIEF SUMMARY

Example implementations of the present disclosure are directed to monitoring access to a confined space using measures of received signal strength or quality to and from a mobile device to monitor entry to and exit from the confined space. Some example implementations capture and analyze radio performance to and from a mobile device while the mobile device is outside a confined space, and as the mobile device enters the confined space. This radio performance may be captured and analyzed for as long as the mobile device remains in the confined space, and as the mobile device exits the confined space area.

Example implementations recognize that received signal strength to and from a mobile device may be highly attenuated, and quality degraded, as the mobile device enters a confined space. In the case of confined spaces within an aircraft, the amount of attenuation and quality degradation may vary by location within the aircraft, and the locations from which radio signals are transmitted to the mobile device, and to which radio signals are transmitted from the mobile device, in relation to the confined space. Radio signal performance data variances greater than threshold amounts as experienced in past evaluations may be used to determine that the mobile device and worker carrying the mobile device has entered or exited a confined space.

The present disclosure thus includes, without limitation, the following example implementations.

Some example implementations provide a method of tracking entry to and exit from a confined space, the method comprising transmitting a first radio signal with a portable radio beacon identifier that is associated with the confined space, the first radio signal transmitted from a portable radio beacon placed proximate to but outside the confined space, and received at a mobile device; measuring a first real-time value of a first measure of received signal strength or quality from the portable radio beacon at the mobile device; transmitting a second radio signal with the portable radio beacon identifier and the first real-time value from the mobile device, and receiving the second radio signal at a base station; measuring a second real-time value of a second measure of received signal strength or quality from the mobile device at the base station, the second measure of received signal strength or quality the same as or different from the first measure of received signal strength or quality; transmitting data including the portable radio beacon identifier, and real-time values including the first real-time value and the second real-time value, from the base station, and receiving the data at a computer; and at the computer, determining proximity of the mobile device to the confined space from the portable radio beacon identifier; and determining whether the mobile device is outside or inside the confined space from the real-time values.

In some example implementations of the method of any preceding example implementation, or any combination of any preceding example implementations, each of the first measure of received signal strength or quality, and the second measure of received signal strength or quality, includes one or more of received signal strength indicator (RSSI), bit error rate (BER) or signal-to-noise ratio (SNR).

In some example implementations of the method of any preceding example implementation, or any combination of any preceding example implementations, the method further comprises transmitting a radio signal from the base station, and receiving the radio signal at the mobile device; and measuring an additional second real-time value of the second measure of received signal strength or quality from the base station at the mobile device, wherein the second radio signal is transmitted further with the additional second real-time value, and the real-time values in the data transmitted from the base station further include the additional second real-time value.

In some example implementations of the method of any preceding example implementation, or any combination of any preceding example implementations, the method further comprises equipping a worker with the mobile device for use in an area including a structure that defines the confined space; and repeatedly while the worker is within the area, measuring the real-time values including the first real-time value and the second real-time value; and determining whether the mobile device is outside or inside the confined space from the real-time values, changes in the real-time values while the worker is within the area indicating movement of the mobile device entering or exiting the confined space.

In some example implementations of the method of any preceding example implementation, or any combination of any preceding example implementations, the first radio signal is transmitted according to a first radio access technology, and the second radio signal is transmitted according to a second radio access technology that is different from the first radio access technology.

In some example implementations of the method of any preceding example implementation, or any combination of any preceding example implementations, the base station is of a radio access network coupled to a core network, and the data is addressed to the computer on the core network.

In some example implementations of the method of any preceding example implementation, or any combination of any preceding example implementations, the base station is of a radio access network coupled to a core network, and the data is addressed to the computer on an external network coupled to the core network.

In some example implementations of the method of any preceding example implementation, or any combination of any preceding example implementations, the real-time values are within a first range of corresponding values that indicate the mobile device is outside the confined space, or a second range of corresponding values less than the first range of corresponding values and that indicate the mobile device is inside the confined space.

In some example implementations of the method of any preceding example implementation, or any combination of any preceding example implementations, the real-time values are described by a real-time value vector, and determining whether the mobile device is outside or inside the confined space includes performing a similarity match between the real-time value vector and a database of feature vectors that describe corresponding values of the mobile device outside and inside the confined space.

In some example implementations of the method of any preceding example implementation, or any combination of any preceding example implementations, the mobile device has a mobile device identifier that is associated with a worker, wherein the second radio signal is transmitted further with the mobile device identifier, and the data is transmitted further including the mobile device identifier, and wherein the method further comprises at the computer, identifying the worker from the mobile device identifier.

In some example implementations of the method of any preceding example implementation, or any combination of any preceding example implementations, the method further comprises transmitting radio signals with respective fixed radio beacon identifiers from fixed radio beacons at fixed locations in or around an area including a structure that defines the confined space, and receiving the radio signals at the mobile device; measuring third real-time values of a third measure of received signal strength or quality from the fixed radio beacons at the mobile device, the third measure of received signal strength or quality the same as or different from either or both the first measure of received signal strength or quality, or the second measure of received signal strength or quality, the second radio signal and the data transmitted further with and including the respective fixed radio beacon identifiers and the third real-time values; and at the computer, determining a location of the mobile device in the area from the respective fixed radio beacon identifiers and the third real-time values.

In some example implementations of the method of any preceding example implementation, or any combination of any preceding example implementations, the method further comprises receiving radio signals at the mobile device from satellites of a satellite navigation system; and determining a geographic location of the mobile device from the radio signals, the second radio signal and the data transmitted further with and including the geographic location of the mobile device.

In some example implementations of the method of any preceding example implementation, or any combination of any preceding example implementations, the method further comprises measuring and producing measurements of a condition of an environment of the confined space or a worker equipped with the mobile device, using a sensor on the mobile device, the second radio signal and the data transmitted further with and including the measurements; and at the computer, determining or monitoring the condition of the environment or the worker from the measurements.

Some example implementations provide a system for tracking entry to and exit from a confined space, the system comprising a portable radio beacon placed proximate to but outside the confined space, and configured to transmit a first radio signal with a portable radio beacon identifier that is associated with the confined space; a mobile device configured to receive the first radio signal, measure a first real-time value of a first measure of received signal strength or quality from the portable radio beacon, and transmit a second radio signal with the portable radio beacon identifier and the first real-time value; and a base station configured to receive the second radio signal, measure a second real-time value of a second measure of received signal strength or quality from the mobile device, the second measure of received signal strength or quality the same as or different from the first measure of received signal strength or quality, and transmit data including the portable radio beacon identifier, and real-time values including the first real-time value and the second real-time value, the base station configured to transmit the data to cause a computer in receipt of the data to determine proximity of the mobile device to the confined space from the portable radio beacon identifier, and determine whether the mobile device is outside or inside the confined space from the real-time values.

In some example implementations of the system of any preceding example implementation, or any combination of any preceding example implementations, each of the first measure of received signal strength or quality, and the second measure of received signal strength or quality, includes one or more of received signal strength indicator (RSSI), bit error rate (BER) or signal-to-noise ratio (SNR).

In some example implementations of the system of any preceding example implementation, or any combination of any preceding example implementations, the base station is further configured to transmit a radio signal, and the mobile device is configured to receive the radio signal and measure an additional second real-time value of the second measure of received signal strength or quality from the base station at the mobile device, and wherein the second radio signal is transmitted further with the additional second real-time value, and the real-time values in the data transmitted from the base station further include the additional second real-time value.

In some example implementations of the system of any preceding example implementation, or any combination of any preceding example implementations, the portable radio beacon is configured to transmit the first radio signal according to a first radio access technology, and the mobile device is configured to transmit the second radio signal according to a second radio access technology that is different from the first radio access technology.

In some example implementations of the system of any preceding example implementation, or any combination of any preceding example implementations, the system further comprises the computer configured to determine the proximity of the mobile device to the confined space from the portable radio beacon identifier, and determine whether the mobile device is outside or inside the confined space from the real-time values.

In some example implementations of the system of any preceding example implementation, or any combination of any preceding example implementations, the base station is of a radio access network coupled to a core network, and the base station is configured to transmit the data addressed to the computer on the core network.

In some example implementations of the system of any preceding example implementation, or any combination of any preceding example implementations, the base station is of a radio access network coupled to a core network, and the base station is configured to transmit the data addressed to the computer on an external network coupled to the core network.

In some example implementations of the system of any preceding example implementation, or any combination of any preceding example implementations, the real-time values are within a first range of corresponding values that indicate the mobile device is outside the confined space, or a second range of corresponding values less than the first range of corresponding values and that indicate the mobile device is inside the confined space.

In some example implementations of the system of any preceding example implementation, or any combination of any preceding example implementations, the real-time values are described by a real-time value vector, and the base station is configured to transmit the data to cause the computer in receipt of the data to perform a similarity match between the real-time value vector and a database of feature vectors that describe corresponding values of the mobile device outside and inside the confined space, the computer thereby caused to determine whether the mobile device is outside or inside the confined space from the real-time values.

In some example implementations of the system of any preceding example implementation, or any combination of any preceding example implementations, the mobile device has a mobile device identifier that is associated with a worker, and wherein the mobile device is configured to transmit the second radio signal further with the mobile device identifier, and the base station is configured to transmit the data further including the mobile device identifier, the base station configured to transmit the data to cause the computer in receipt of the data to further identify the worker from the mobile device identifier.

In some example implementations of the system of any preceding example implementation, or any combination of any preceding example implementations, the system further comprises fixed radio beacons at fixed locations in or around an area including a structure that defines the confined space, the fixed radio beacons configured to transmit radio signals with respective fixed radio beacon identifiers, wherein the mobile device is further configured to receive the radio signals, measure third real-time values of a third measure of received signal strength or quality from the fixed radio beacons, the third measure of received signal strength or quality the same as or different from either or both the first measure of received signal strength or quality, or the second measure of received signal strength or quality, and transmit the second radio signal further with the respective fixed radio beacon identifiers and the third real-time values, and wherein the base station is configured to transmit the data further including the respective fixed radio beacon identifiers and the third real-time values, the base station configured to transmit the data to cause the computer in receipt of the data to further determine a location of the mobile device in the area from the respective fixed radio beacon identifiers and the third values.

In some example implementations of the system of any preceding example implementation, or any combination of any preceding example implementations, the mobile device is further configured to receive radio signals at the mobile device from satellites of a satellite navigation system, and determine a geographic location of the mobile device from the radio signals, the second radio signal and the data transmitted further with and including the geographic location of the mobile device.

In some example implementations of the system of any preceding example implementation, or any combination of any preceding example implementations, the mobile device further includes a sensor configured to measure and produce measurements of a condition of an environment of the confined space or a worker equipped with the mobile device, and the mobile device is configured to transmit the second radio signal further with the measurements, and wherein the base station is configured to transmit the data further including the measurements, the base station configured to transmit the data to cause the computer in receipt of the data to further determine or monitor the condition of the environment or the worker from the measurements.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
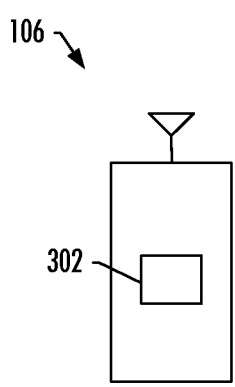
Figure 4A:
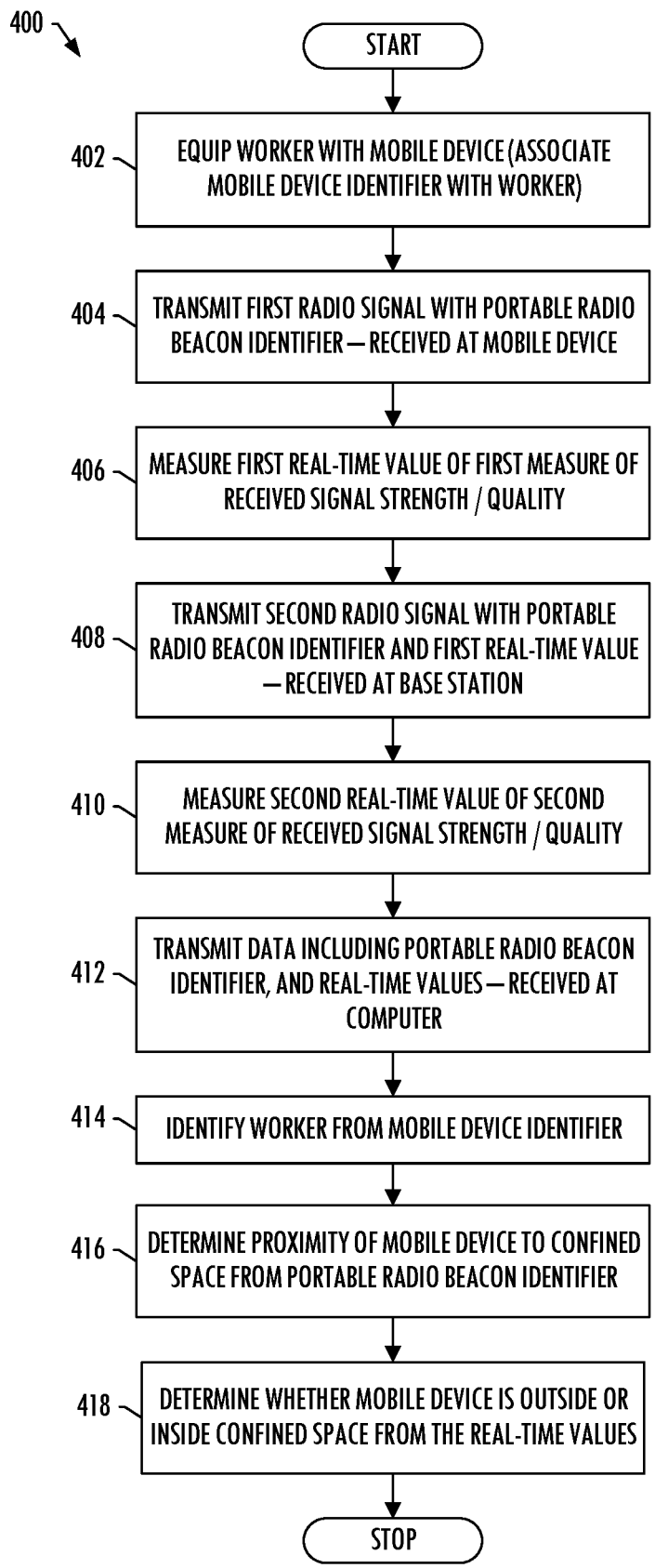
Figure 4B:
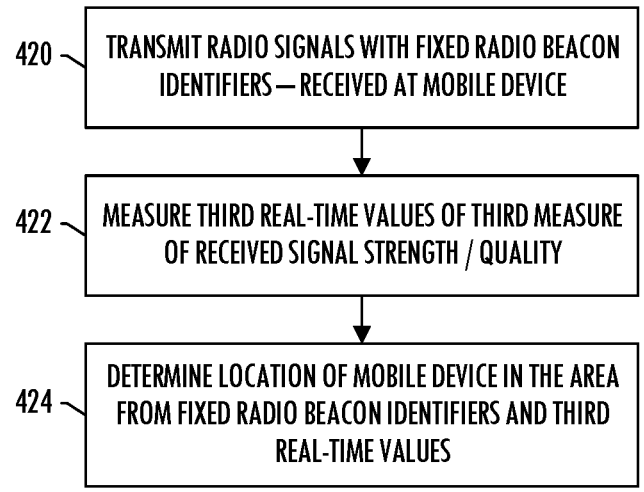
Figure 4C:
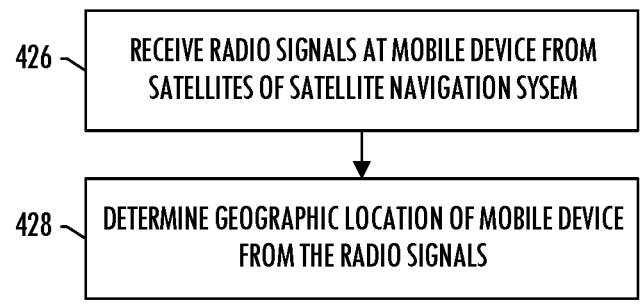
Figure 4D:
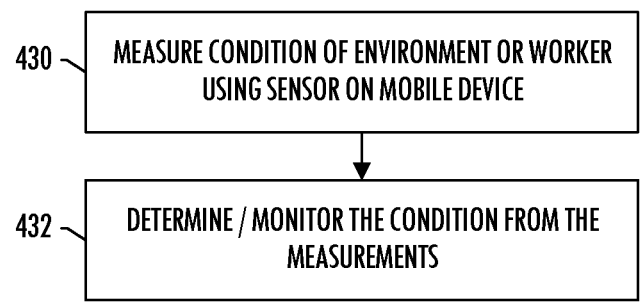
Figure 5:
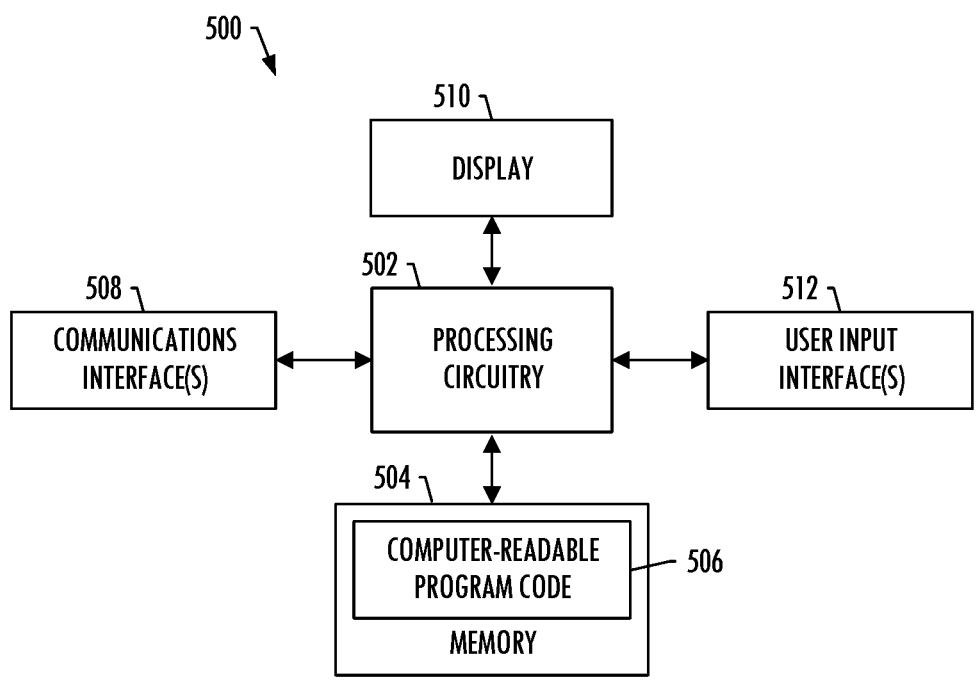

FIG. 3 more particularly illustrates a mobile device of the system, according to some example implementations;

FIGS. 4 A, 4B, 4C and 4D are flowcharts illustrating various steps in a method of tracking entry to and exit from a confined space, according to various example implementations; and FIG. 5 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to monitoring access to a confined space and, in particular, to monitoring entry to and exit from a confined space using measures of received signal strength or quality to and from a mobile device. As described herein, a "confined space" is any space within a structure (e.g., aircraft or aircraft part) that is large enough and so configured so that a human worker can bodily enter and perform work, has limited or restricted means of entry or exit, and is not designed for continuous human occupancy. A hazardous confined space is a confined space that contains or has potential to contain a hazardous atmosphere, has an internal shape that could cause entrapment or asphyxiation, or that contains any other recognized safety or health hazard. Examples of suitable confined spaces within an aircraft or aircraft part include fuel tanks in the wing or tail section. These confined spaces are locations on an aircraft that are not designed for occupancy but that are accessible for aircraft assembly, inspection, maintenance or other purposes. It should be understood, however, that example implementations are equally applicable to any of a number of different confined spaces in any of a number of different structures.

Figure 1A:
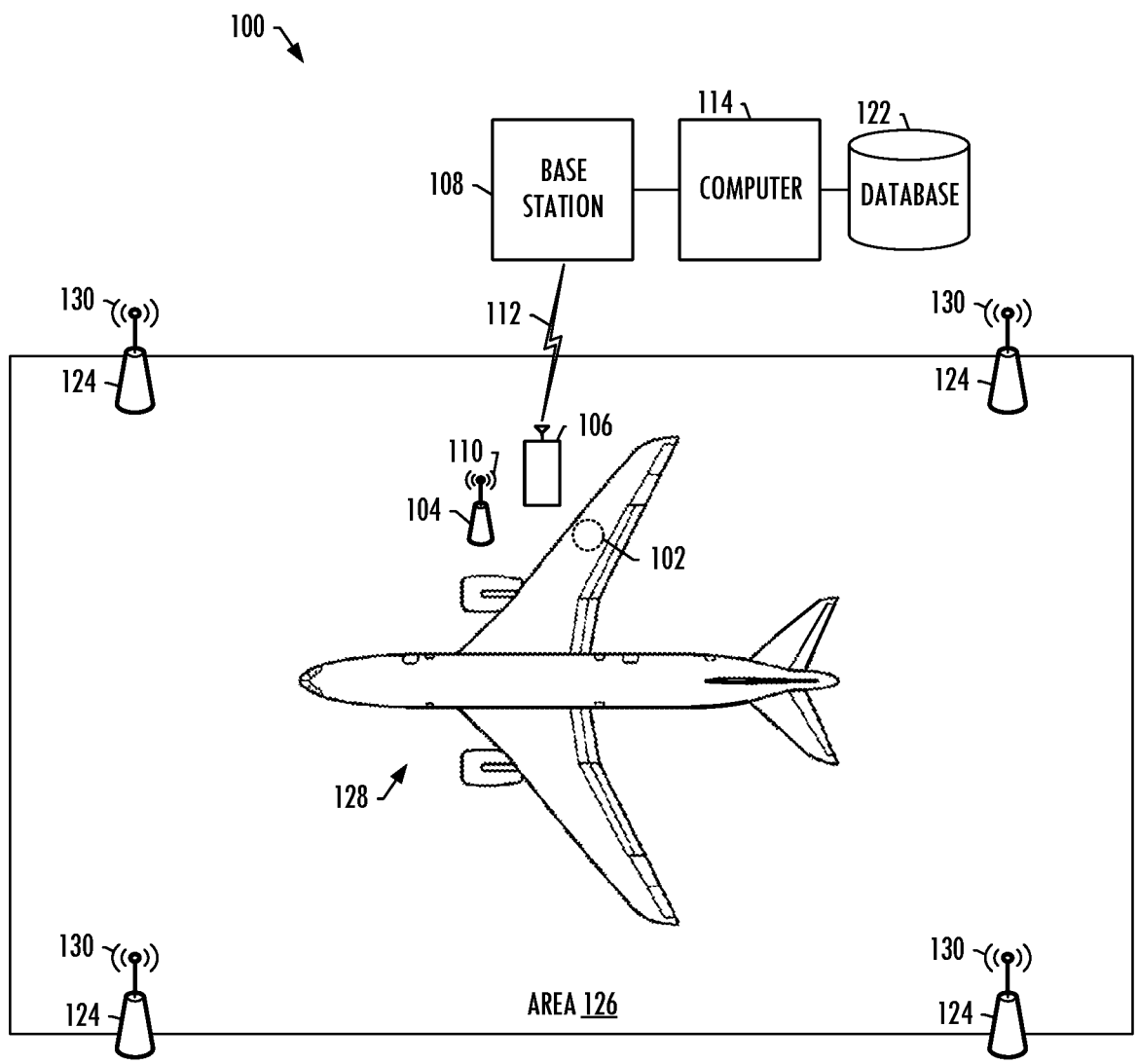
FIGS. 1A, 1B and 1C illustrate a system for tracking entry to and exit from a confined space, according to some example implementations of the present disclosure.
Figure 1B:
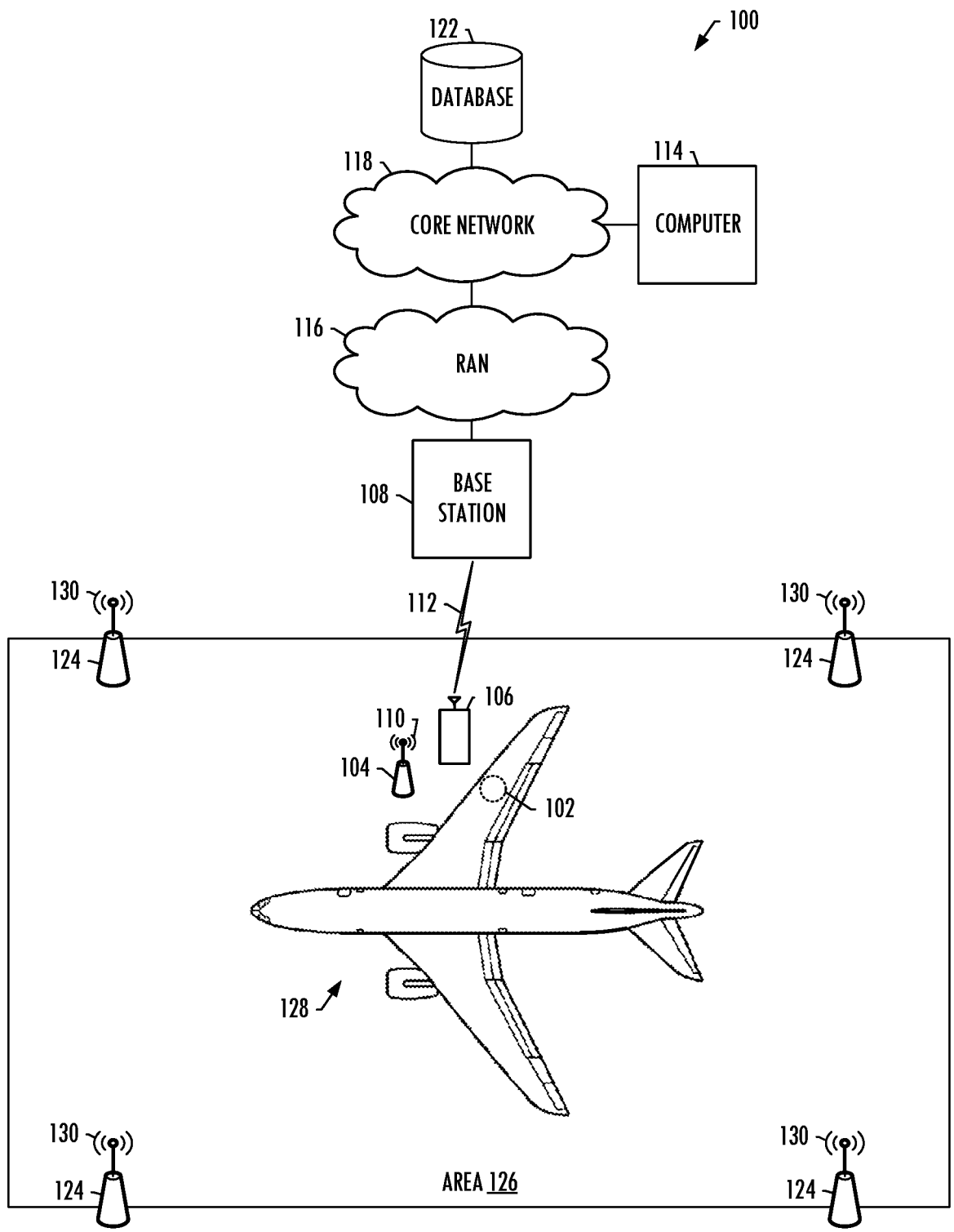
Figure 1C:
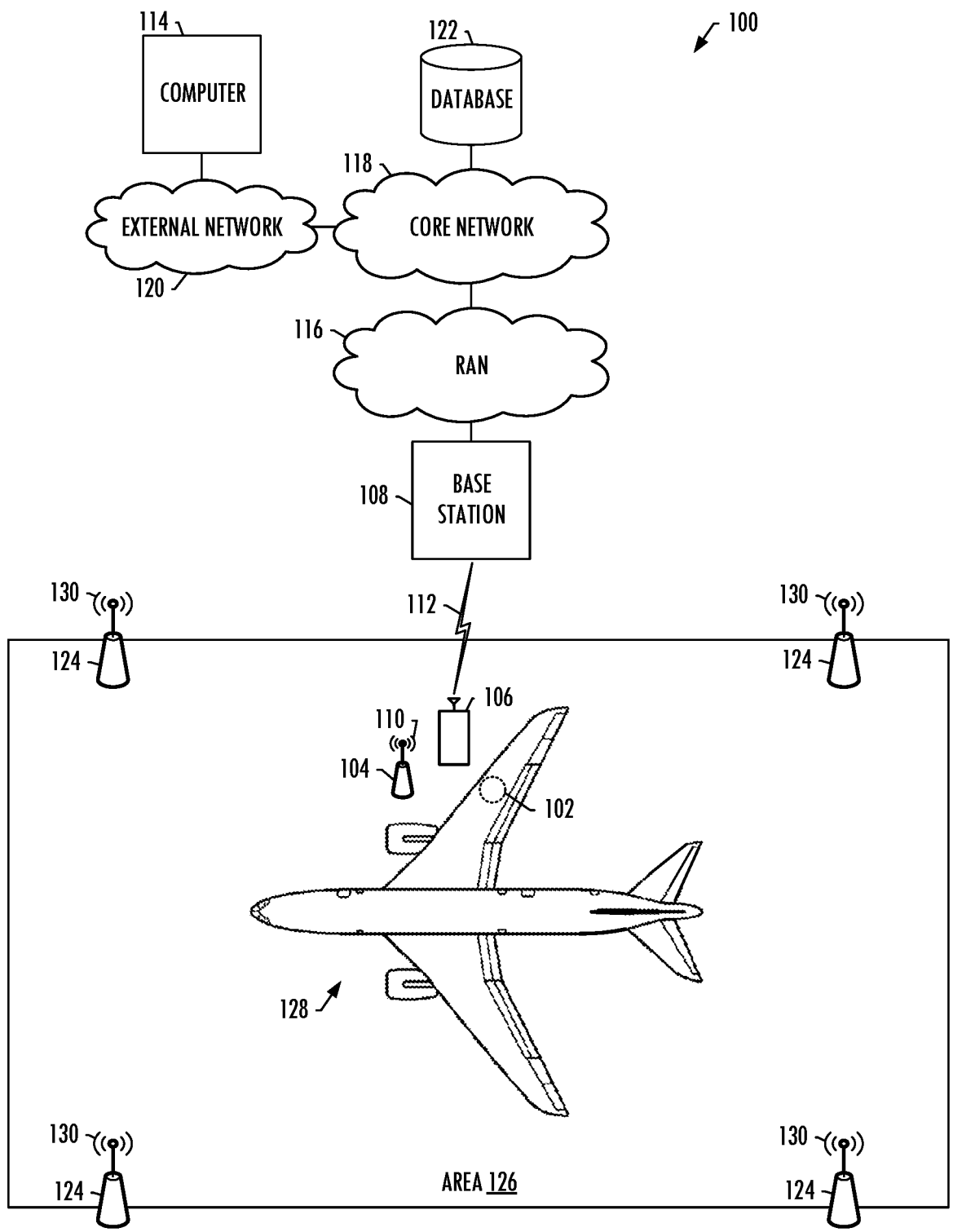

FIGS. 1A, 1B and 1C illustrate a system 100 for tracking entry to and exit from a confined space 102, according to some example implementations of the present disclosure. The system includes one or more of each of a number of different components including, as shown, a portable radio beacon 104, a mobile device 106 and a base station 108. The portable radio beacon is generally a hardware transmitter configured to broadcast or otherwise transmit its identifier—referred to as a portable radio beacon identifier. The mobile device is generally a computing device small enough to be carried by or fixed to a worker. Examples of suitable mobile devices include portable computers (e.g., laptop computer, tablet computer), mobile phones (e.g., cell phone, smartphone), wearable computers (e.g., smartwatch), and the like. The base station is generally a transceiver connecting devices to one another and/or to a wider area.

According to example implementations of the present disclosure, the portable radio beacon 104 is placed proximate to but outside the confined space 102, and configured to transmit a first radio signal 110 with its portable radio beacon identifier that is associated with the confined space. The mobile device 106 is configured to receive the first radio signal, measure a first real-time value of a first measure of received signal strength or quality from the portable radio beacon, and transmit a second radio signal 112 with the portable radio beacon identifier and the first real-time value. Examples of a suitable first measure of received signal strength or quality includes one or more of received signal strength indicator (RSSI), bit error rate (BER) or signal-to-noise ratio (SNR).

In some examples, the portable radio beacon 104 is configured to transmit the first radio signal 110 according to a first radio access technology, and the mobile device 106 is configured to transmit the second radio signal 112 according to a second radio access technology that is different from the first radio access technology. In other examples, the portable radio beacon and mobile device are configured to transmit respectively the first radio signal and the second radio signal according to a common radio access technology. Examples of suitable radio access technologies include 3GPP radio access technologies including GSM, UMTS, LTE, 5G NR and the like, wireless local area network (WLAN) technologies (e.g., IEEE 802.xx, e.g., 802.11a, 802.11b, 802.11g, 802.11n), IEEE 802.15, IEEE 802.16, Bluetooth®, Bluetooth Low Energy (BLE), and the like.

The base station 108 is configured to receive the second radio signal 112, and measure a second real-time value of a second measure of received signal strength or quality from the mobile device 106. This second measure of received signal strength or quality is the same as or different from the first measure of received signal strength or quality. In this regard, as before, examples of a suitable second measure includes RSSI, BER or SNR.

Additionally, or alternatively, the base station 108 may be configured to transmit a radio signal with a base station identifier. The mobile device 106 may be configured to receive the radio signal, and measure a real-time value of a measure of received signal strength or quality (e.g., RSSI, BER, SNR) from the base station. The second radio signal 112, then, may further include the base station identifier and the real-time value. This measure of received signal strength or quality, and real-time value, may take the place of the above-described second measure and second real-time value, or may be an additional second measure and second real-time value, as between the mobile device and base station.

The base station 108 is configured to transmit data including the portable radio beacon identifier (and possibly the base station identifier), and real-time values including the first real-time value and the second real-time value(s). In this regard, the base station is configured to transmit the data to cause a computer 114 in receipt of the data to determine proximity of the mobile device 106 to the confined space 102 from the portable radio beacon identifier, and determine whether the mobile device is outside or inside the confined space from the real-time values. In some examples, the system 100 further includes the computer configured to determine the proximity of the mobile device to the confined space from the portable radio beacon identifier that is associated with the confined space, and determine whether the mobile device is outside or inside the confined space from the real-time values.

As indicated above, example implementations of the present disclosure recognize that received signal strength to and from a mobile device may be highly attenuated, and quality degraded, as the mobile device enters a confined space. Variances of the real-time values greater than threshold amounts as experienced in past evaluations may be used to determine that the mobile device 106 has entered or exited a confined space. In some examples, then, the real-time values are within a first range of corresponding values that indicate the mobile device 106 is outside the confined space 102, or a second range of corresponding values less than the first range of corresponding values and that indicate the mobile device is inside the confined space.

In some examples, the real-time values are described by a real-time value vector. In some of these examples, the base station 108 is configured to transmit the data to cause the computer 114 in receipt of the data to perform a similarity match between the real-time value vector and a database 122 of feature vectors that describe corresponding values of the mobile device 106 outside and inside the confined space 102. In these examples, the computer is thereby caused to determine whether the mobile device is outside or inside the confined space from the real-time values. As shown in FIG. 1A, the database may be coupled to the computer. In other examples, as shown in FIGS. 1B and 1C, the database may be coupled to and accessible from the core network 118. In yet other examples, the database may be coupled to and accessible from the external network 120.

In some examples, the mobile device 106 has a mobile device identifier that is associated with a worker. In some of these examples, the mobile device is configured to transmit the second radio signal 112 further with the mobile device identifier. The base station 108, then, is configured to transmit the data further including the mobile device identifier, causing the computer 114 in receipt of the data to further identify the worker from the mobile device identifier.

As shown in FIG. 1A, in some examples, the computer 114 is coupled to the base station 108, and the base station is configured to transmit the data directly to the computer. In FIG. 1B, in other examples, the base station is of a radio access network (RAN) 116 coupled to a core network 118 to which the computer is coupled. In these examples, the base station is configured to transmit the data addressed to the computer on the core network. In yet other examples, as shown in FIG. 1C, the core network is coupled to an external network 120 to which the computer is coupled. In these examples, the base station is configured to transmit the data addressed to the computer on the external network coupled to the core network.

In some examples, the system 100 further includes fixed radio beacons 124 at fixed locations in or around an area 126 including a structure 128 that defines the confined space 102. In some of these examples, the fixed radio beacons are configured to transmit radio signals 130 with respective fixed radio beacon identifiers. The mobile device 106 is further configured to receive the radio signals, and measure third real-time values of a third measure of received signal strength or quality (e.g., RSSI, BER, SNR) from the fixed radio beacons. Here, the third measure of received signal strength or quality is the same as or different from either or both the first measure of received signal strength or quality, or the second measure of received signal strength or quality.

Also in some of these examples, the mobile device 106 is configured to transmit the second radio signal 112 further with the respective fixed radio beacon identifiers and the third real-time values. The base station 108 is configured to transmit the data further including the respective fixed radio beacon identifiers and the third real-time values, causing the computer 114 in receipt of the data to further determine a location of the mobile device in the area 126 from the respective fixed radio beacon identifiers and the third values.

The location of the mobile device 106 in the area 126 may be determined from the respective fixed radio beacon identifiers and the third values in any of a number of different manners. In some examples, the location may be determined using a localization technique based on received signal strength or quality (e.g., RSSI, BER, SNR) that makes use of the radio signals 130 to estimate the distances between the fixed radio beacons 124 and the mobile device. One example of a suitable technique is described in Zhang et al., *Wireless Localization Based on RSSI Fingerprint Feature Vector*, 2015 INT'L J. OF DISTRIBUTED SENSOR NETWORKS 8 (2015).

Figure 2:
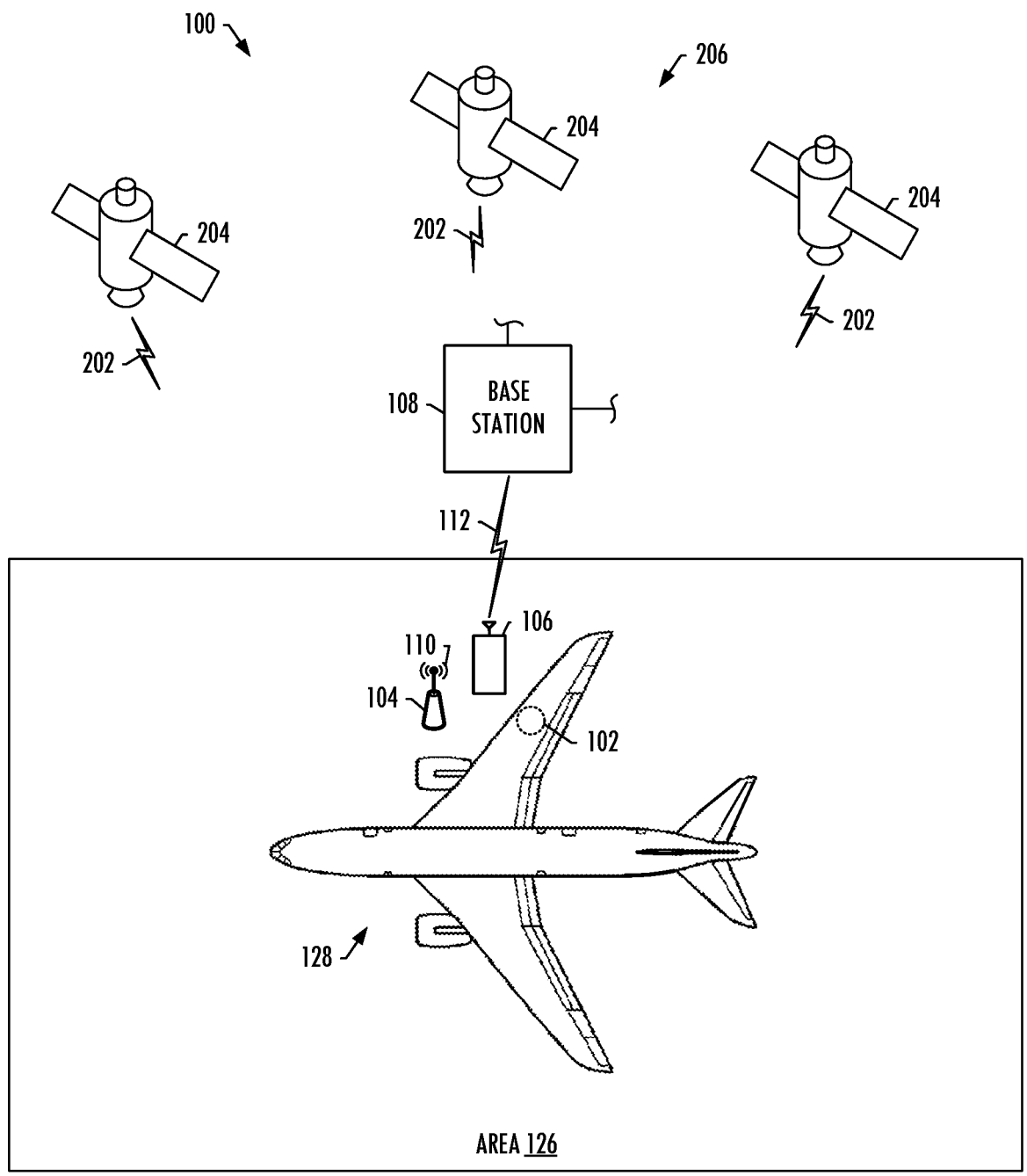
FIG. 2 illustrates part of the system in some example implementations in which location of the mobile device may be determined according to satellite-based navigation.

In some examples, satellite-based navigation may be used to locate the mobile device 106, which may be particularly useful when the structure 128 that defines the confined space 102 is outdoors. FIG. 2 illustrates part of the system 100 in some example implementations in which location of the mobile device may be determined according to satellite-based navigation. In some examples, as shown, the mobile device is further configured to receive radio signals 202 at the mobile device from satellites 204 of a satellite navigation system 206 (e.g., GPS, GLONASS). In these examples, the mobile device is configured to determine a geographic location of the mobile device from the radio signals, and the second radio signal 112 and the data are transmitted further with and including the geographic location of the mobile device. In these examples, the system may be as in FIG. 1A, 1B or 1C, with or without the fixed radio beacons 124.

FIG. 3 illustrates the mobile device 106 according to some examples in which the mobile device further includes a sensor 302 configured to measure and produce measurements of a condition of an environment of the confined space or a worker equipped with the mobile device. This may include measurements of an amount of a chemical that comes into contact with the sensor. In other examples, the sensor may be a sensor to measure a condition of the environment and/or worker that may provide some situational awareness, or a sensor to measure condition of the worker, such as a health condition like heart rate, oxygen saturation or the like. In some of these examples, the mobile device is configured to transmit the second radio signal 112 further with the measurements. Also in these examples, the base station 108 is configured to transmit the data further including the measurements, causing the computer 114 in receipt of the data to further determine or monitor the condition of the environment or the worker from the measurements.

In FIGS. 1A, 1B and 1C, the system 100 for tracking entry to and exit from a confined space 102 is shown as including a portable radio beacon 104 and a mobile device 106, where a worker may be equipped with the mobile device, and a structure 128 in an area 126 may define the confined space. It should be understood, however, that the system may be equally useful for tracking entry to and exit from a plurality of confined spaces defined by the same structure and/or a plurality of structures in the area. In these examples, the system may include a plurality of portable radio beacons and a plurality of mobile devices for a plurality of workers. Even further, in some examples, the system may include a plurality of base stations 108 with respective base station identifiers.

In some examples in which the system 100 is configured to track entry to and exit from a plurality of confined spaces 102, the plurality of portable radio beacons 104 may have portable radio beacon identifiers associated with respective ones of the plurality of confined spaces 102. The plurality of workers may be equipped with respective ones of the plurality of mobile devices 106, and associated with mobile device identifiers. The system may operate in a manner similar to that described above, and the computer 114 may distinguish the confined spaces by the portable radio beacon identifiers associated with respective ones of the confined spaces. Likewise, the computer may distinguish workers by the mobile device identifiers of the mobile devices with which the workers are equipped (and that are associated with the workers). Additionally or alternatively, the system may track a mobile device moving between confined spaces distinguishable by portable radio beacon identifiers of portable radio beacons placed proximate to but outside the confined spaces. Even further, the system may track a mobile device moving between coverage of base stations 108 distinguishable by base station identifiers placed around the area 126.

FIGS. 4 A, 4B, 4C and 4D are flowcharts illustrating various steps in a method of tracking entry to and exit from a confined space 102, according to various example implementations. As shown at block 402 in FIG. 4A, in some examples, the method includes equipping a worker with the mobile device 106 for use in an area 126 including a structure 128 that defines the confined space. In some examples, the mobile device has a mobile device identifier that is associated with the worker.

The method 400 includes transmitting a first radio signal 110 with a portable radio beacon identifier that is associated with the confined space 102. The first radio signal is transmitted from a portable radio beacon 104 placed proximate to but outside the confined space, and received at a mobile device 106, as shown at block 404. The method includes measuring a first real-time value of a first measure of received signal strength or quality from the portable radio beacon at the mobile device, and transmitting a second radio signal 112 with the portable radio beacon identifier and the first real-time value from the mobile device, and receiving the second radio signal at a base station 108, as shown at blocks 406 and 408. In some examples in which the mobile device has a mobile device identifier that is associated with the worker, the the second radio signal is transmitted further with the mobile device identifier.

As shown at block 410, the method 400 includes measuring a second real-time value of a second measure of received signal strength or quality from the mobile device 106 at the base station 108. This second measure of received signal strength or quality is the same as or different from the first measure of received signal strength or quality. The method includes transmitting data including the portable radio beacon identifier, and real-time values including the first real-time value and the second real-time value, from the base station, and receiving the data at a computer 114, as shown at block 412. And in some examples including the second radio signal 112 with the mobile device identifier, the data is transmitted further including the mobile device identifier.

In some examples, the method 400 includes, at the computer 114, identifying the worker from the mobile device identifier, as shown at block 414. The method includes, at the computer, determining proximity of the mobile device 106 to the confined space 102 from the portable radio beacon identifier, and determining whether the mobile device is outside or inside the confined space from the real-time values, as shown at blocks 416 and 418. In some examples, the method includes measuring the real-time values including the first real-time value and the second real-time value, and determining whether the mobile device is outside or inside the confined space from the real-time values, repeatedly while the worker is within the area 126. Here, changes in the real-time values while the worker is within the area may indicate movement of the mobile device entering or exiting the confined space.

In some examples, the method 400 further includes transmitting radio signals 130 with respective fixed radio beacon identifiers from fixed radio beacons 124 at fixed locations in or around an area 126 including a structure 128 that defines the confined space 102, and receiving the radio signals at the mobile device 106, as shown at block 420 in FIG. 4B. In some of these examples, the method also includes measuring third real-time values of a third measure of received signal strength or quality from the fixed radio beacons at the mobile device, as shown at block 422. The third measure of received signal strength or quality is the same as or different from either or both the first measure of received signal strength or quality, or the second measure of received signal strength or quality. The second radio signal 112 and the data are transmitted further with and including the respective fixed radio beacon identifiers and the third real-time values. And at the computer 114, the method includes determining a location of the mobile device in the area from the respective fixed radio beacon identifiers and the third real-time values, as shown at block 424.

In some examples, the method 400 further includes receiving radio signals 202 at the mobile device 106 from satellites 204 of a satellite navigation system 206, and determining a geographic location of the mobile device from the radio signals, as shown at blocks 426 and 428 in FIG. 4C. In some of these examples, the second radio signal 112 and the data are transmitted further with and including the geographic location of the mobile device.

In some examples, the method 400 further includes measuring and producing measurements of a condition of an environment of the confined space or a worker equipped with the mobile device, using a sensor 302 on the mobile device 106, and determining or monitoring the condition of the environment or the worker from the measurements, as shown at blocks 430 and 432 in FIG. 4D. Similar to before, in some of these examples, the second radio signal 112 and the data are transmitted further with and including the measurements; and at the computer 114.

According to example implementations of the present disclosure, the system 100 and its components, including in various example implementations, the portable radio beacon 104, mobile device 106, base station 108, computer 114, database 122, fixed and radio beacons 124, may be implemented or otherwise executed by various means. These means may include hardware, alone or under direction of one or more computer programs from a computer-readable storage medium. In some examples, one or more apparatuses may be configured to function as or otherwise implement one or more of the components shown and described herein.

FIG. 5 illustrates an apparatus 500 according to some example implementations of the present disclosure. Generally, an apparatus of example implementations of the present disclosure may comprise, include or be embodied in one or more fixed, portable or mobile electronic devices. The apparatus may include one or more of each of a number of components such as, for example, processing circuitry 502 (e.g., processor unit) connected to a memory 504 (e.g., storage device).

The processing circuitry 502 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 504 (of the same or another apparatus).

The processing circuitry 502 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processing circuitry 502 may also be connected to one or more interfaces for displaying, transmitting and/or receiving information. The interfaces may include communications interface(s) 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or user input interface(s) 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touch-screen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 500 may include a processing circuitry 502 and a computer-readable storage medium or memory 504 coupled to the processing circuitry, where the processing circuitry is configured to execute computer-readable program code 506 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of tracking entry to and exit from a confined space, the method comprising:
   transmitting a first radio signal with a portable radio beacon identifier that is associated with the confined space, the first radio signal transmitted from a portable radio beacon placed proximate to but outside the confined space, and received at a mobile device;
   measuring a first real-time value of a first measure of received signal strength or quality from the portable radio beacon at the mobile device;
   transmitting a second radio signal with the portable radio beacon identifier and the first real-time value from the mobile device, and receiving the second radio signal at a base station;
   measuring a second real-time value of a second measure of received signal strength or quality from the mobile device at the base station, the second measure of received signal strength or quality the same as or different from the first measure of received signal strength or quality;
   transmitting data including the portable radio beacon identifier, and real-time values including the first real-time value and the second real-time value, from the base station, and receiving the data at a computer; and
   at the computer,
   determining proximity of the mobile device to the confined space from the portable radio beacon identifier; and
   determining whether the mobile device is outside or inside the confined space from the real-time values,
   wherein the real-time values are within a first range of corresponding values that indicate the mobile device is outside the confined space, or a second range of corresponding values less than the first range of corresponding values and that indicate the mobile device is inside the confined space.

2. The method of claim 1, wherein each of the first measure of received signal strength or quality, and the second measure of received signal strength or quality, includes one or more of received signal strength indicator (RSSI), bit error rate (BER) or signal-to-noise ratio (SNR).

3. The method of claim 1 further comprising:
   transmitting a radio signal from the base station, and receiving the radio signal at the mobile device; and
   measuring an additional second real-time value of the second measure of received signal strength or quality from the base station at the mobile device,
   wherein the second radio signal is transmitted further with the additional second real-time value, and the real-time values in the data transmitted from the base station further include the additional second real-time value.

4. The method of claim 1 further comprising:
   equipping a worker with the mobile device for use in an area including a structure that defines the confined space; and repeatedly while the worker is within the area,
   measuring the real-time values including the first real-time value and the second real-time value; and
   determining whether the mobile device is outside or inside the confined space from the real-time values, changes in the real-time values while the worker is within the area indicating movement of the mobile device entering or exiting the confined space.

5. The method of claim 1, wherein the first radio signal is transmitted according to a first radio access technology, and the second radio signal is transmitted according to a second radio access technology that is different from the first radio access technology.

6. The method of claim 1, wherein the base station is of a radio access network coupled to a core network, and the data is addressed to the computer on the core network.

7. The method of claim 1, wherein the base station is of a radio access network coupled to a core network, and the data is addressed to the computer on an external network coupled to the core network.

8. The method of claim 1, wherein the real-time values are described by a real-time value vector, and determining whether the mobile device is outside or inside the confined space includes performing a similarity match between the real-time value vector and a database of feature vectors that describe corresponding values of the mobile device outside and inside the confined space.

9. The method of claim 1, wherein the mobile device has a mobile device identifier that is associated with a worker,
   wherein the second radio signal is transmitted further with the mobile device identifier, and the data is transmitted further including the mobile device identifier, and
   wherein the method further comprises at the computer, identifying the worker from the mobile device identifier.

10. The method of claim 1 further comprising:
    transmitting radio signals with respective fixed radio beacon identifiers from fixed radio beacons at fixed locations in or around an area including a structure that defines the confined space, and receiving the radio signals at the mobile device;
    measuring third real-time values of a third measure of received signal strength or quality from the fixed radio beacons at the mobile device, the third measure of received signal strength or quality the same as or different from either or both the first measure of received signal strength or quality, or the second measure of received signal strength or quality, the second radio signal and the data transmitted further with and including the respective fixed radio beacon identifiers and the third real-time values; and at the computer,
    determining a location of the mobile device in the area from the respective fixed radio beacon identifiers and the third real-time values.

11. The method of claim 1 further comprising:
    receiving radio signals at the mobile device from satellites of a satellite navigation system; and
    determining a geographic location of the mobile device from the radio signals, the second radio signal and the data transmitted further with and including the geographic location of the mobile device.

12. The method of claim 1 further comprising:
    measuring and producing measurements of a condition of an environment of the confined space or a worker equipped with the mobile device, using a sensor on the mobile device, the second radio signal and the data transmitted further with and including the measurements; and at the computer, determining or monitoring the condition of the environment or the worker from the measurements.

13. A system for tracking entry to and exit from a confined space, the system comprising:

a portable radio beacon placed proximate to but outside the confined space, and configured to transmit a first radio signal with a portable radio beacon identifier that is associated with the confined space;

a mobile device configured to receive the first radio signal, measure a first real-time value of a first measure of received signal strength or quality from the portable radio beacon, and transmit a second radio signal with the portable radio beacon identifier and the first real-time value; and a base station configured to receive the second radio signal, measure a second real-time value of a second measure of received signal strength or quality from the mobile device, the second measure of received signal strength or quality the same as or different from the first measure of received signal strength or quality, and transmit data including the portable radio beacon identifier, and real-time values including the first real-time value and the second real-time value, the base station configured to transmit the data to cause a computer in receipt of the data to determine proximity of the mobile device to the confined space from the portable radio beacon identifier, and determine whether the mobile device is outside or inside the confined space from the real-time values, wherein the real-time values are within a first range of corresponding values that indicate the mobile device is outside the confined space, or a second range of corresponding values less than the first range of corresponding values and that indicate the mobile device is inside the confined space.

14. The system of claim 13, wherein each of the first measure of received signal strength or quality, and the second measure of received signal strength or quality, includes one or more of received signal strength indicator (RSSI), bit error rate (BER) or signal-to-noise ratio (SNR).

15. The system of claim 13, wherein the base station is further configured to transmit a radio signal, and the mobile device is configured to receive the radio signal and measure an additional second real-time value of the second measure of received signal strength or quality from the base station at the mobile device, and wherein the second radio signal is transmitted further with the additional second real-time value, and the real-time values in the data transmitted from the base station further include the additional second real-time value.

16. The system of claim 13, wherein the portable radio beacon is configured to transmit the first radio signal according to a first radio access technology, and the mobile device is configured to transmit the second radio signal according to a second radio access technology that is different from the first radio access technology.

17. The system of claim 13 further comprising the computer configured to determine the proximity of the mobile device to the confined space from the portable radio beacon identifier, and determine whether the mobile device is outside or inside the confined space from the real-time values.

18. The system of claim 13, wherein the base station is of a radio access network coupled to a core network, and the base station is configured to transmit the data addressed to the computer on the core network.

19. The system of claim 13, wherein the base station is of a radio access network coupled to a core network, and the base station is configured to transmit the data addressed to the computer on an external network coupled to the core network.

20. The system of claim 13, wherein the real-time values are described by a real-time value vector, and the base station is configured to transmit the data to cause the computer in receipt of the data to perform a similarity match between the real-time value vector and a database of feature vectors that describe corresponding values of the mobile device outside and inside the confined space, the computer thereby caused to determine whether the mobile device is outside or inside the confined space from the real-time values.

21. The system of claim 13, wherein the mobile device has a mobile device identifier that is associated with a worker, and wherein the mobile device is configured to transmit the second radio signal further with the mobile device identifier, and the base station is configured to transmit the data further including the mobile device identifier, the base station configured to transmit the data to cause the computer in receipt of the data to further identify the worker from the mobile device identifier.

22. The system of claim 13 further comprising fixed radio beacons at fixed locations in or around an area including a structure that defines the confined space, the fixed radio beacons configured to transmit radio signals with respective fixed radio beacon identifiers, wherein the mobile device is further configured to receive the radio signals, measure third real-time values of a third measure of received signal strength or quality from the fixed radio beacons, the third measure of received signal strength or quality the same as or different from either or both the first measure of received signal strength or quality, or the second measure of received signal strength or quality, and transmit the second radio signal further with the respective fixed radio beacon identifiers and the third real-time values, and wherein the base station is configured to transmit the data further including the respective fixed radio beacon identifiers and the third real-time values, the base station configured to transmit the data to cause the computer in receipt of the data to further determine a location of the mobile device in the area from the respective fixed radio beacon identifiers and the third values.

23. The system of claim 13, wherein the mobile device is further configured to receive radio signals at the mobile device from satellites of a satellite navigation system, and determine a geographic location of the mobile device from the radio signals, the second radio signal and the data transmitted further with and including the geographic location of the mobile device.

24. The system of claim 13, wherein the mobile device further includes a sensor configured to measure and produce measurements of a condition of an environment of the confined space or a worker equipped with the mobile device, and the mobile device is configured to transmit the second radio signal further with the measurements, and wherein the base station is configured to transmit the data further including the measurements, the base station configured to transmit the data to cause the computer in receipt of the data to further determine or monitor the condition of the environment or the worker from the measurements.

* * * * *